United States Patent Office 3,405,926
Patented Oct. 15, 1968

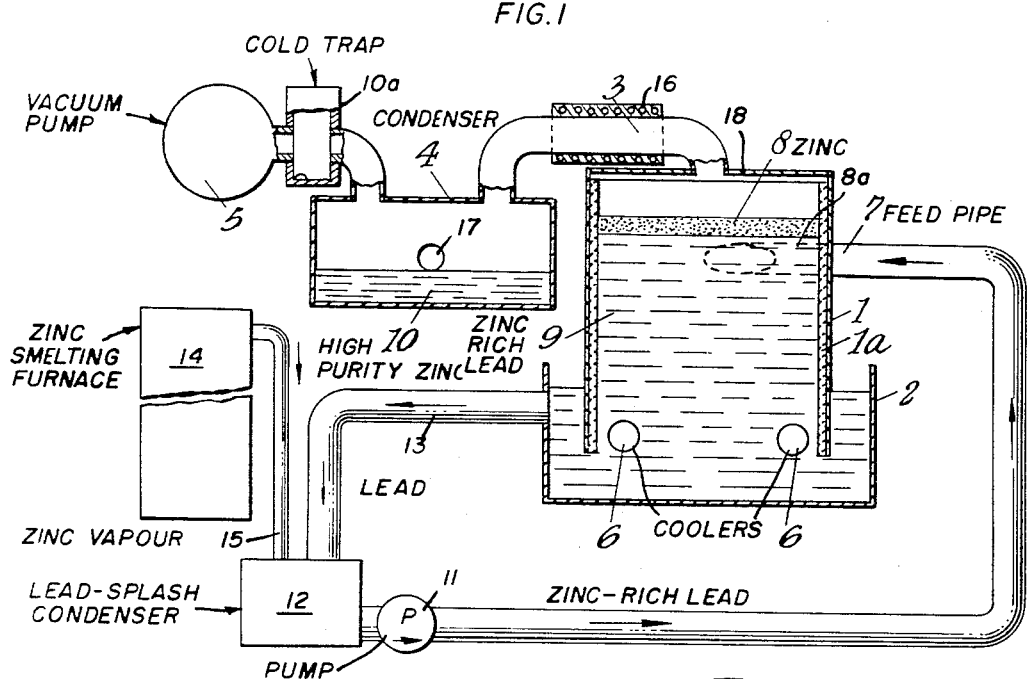
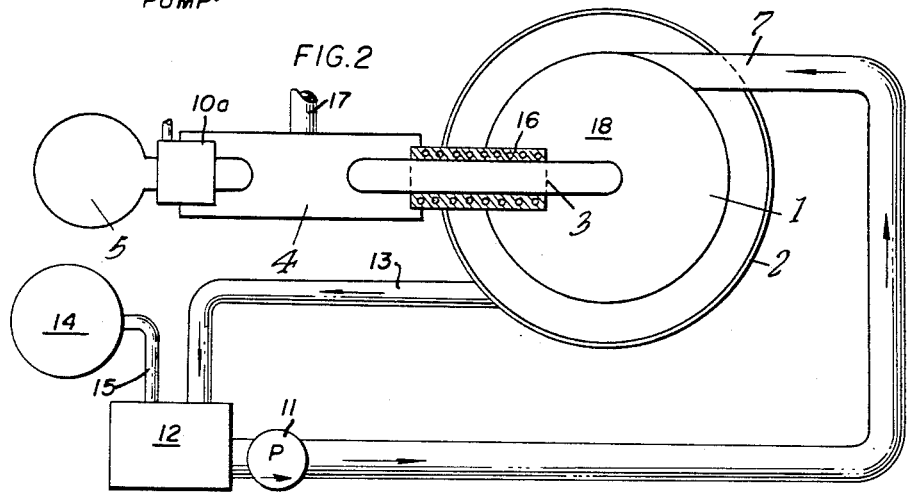

3,405,926
APPARATUS FOR DEZINCING LEAD
Thomas Ronald Albert Davey, Glen Waverley, Victoria, Australia, assignor to Metallurgical Processes Limited, Nassau, Bahamas, a company of the Bahamas, and Imperial Smelting Corporation (N.S.C.) Limited, London, England, a British company doing business as Metallurgical Development Company, Nassau, Bahamas
Original application Oct. 14, 1964, Ser. No. 403,807, now Patent No. 3,360,362, dated Dec. 26, 1967. Divided and this application May 6, 1966, Ser. No. 560,346
17 Claims. (Cl. 266—37)

ABSTRACT OF THE DISCLOSURE

The disclosure relates to apparatus for dezincing a body of molten lead relatively rich in molten zinc, including a primary condenser for condensing zinc vapour initially in the molten lead, a lead-zinc separator to separate a layer of the molten zinc from the body of molten lead, a vacuum pump to withdraw zinc vapour from the layer of molten zinc, and a secondary zinc condenser for condensing the evacuated zinc vapour into molten zinc.

---

This application is a division of my application Ser. No. 403,807, filed Oct. 14, 1964, and now Patent No. 3,360,362.

This invention relates to the dezincing of lead which contains dissolved zinc, such as, for example, the lead leaving the condenser system of a zinc blast furnace.

The invention consists in a method of dezincing molten lead comprising the steps of continuously supplying molten lead which contains dissolved zinc to an enclosed region in which the lead is cooled to throw zinc out of solution and to form a zinc-rich molten layer on top of the body of molten lead, continuously evaporating zinc from the zinc-rich layer and removing molten lead continuously from the lower part of the enclosed region.

Preferably the lead is supplied immediately below the zinc-rich layer and is cooled in the lower part of the enclosed region.

The invention further consists in an apparatus for dezincing lead comprising an inner cylindrical vessel open at the bottom, an outer cylindrical vessel of larger diameter than the first open at the top and in which the inner vessel dips, a zinc vapour offtake at the top of the inner vessel, a zinc condenser connected to the offtake, a vacuum line connected to the condenser, a vacuum pump connected to the vacuum line, a tangentially directed lead inlet duct adjacent the top of the inner vessel and cooling means for the lead adjacent the bottom of the inner vessel.

The invention will be further described with reference to the accompanying drawings.

FIGURE 1 is a schematic sectional lay-out of an apparatus according to the invention; and
FIGURE 2 is a plan view.

In the drawing is shown an inner cylindrical vessel 1 open at the bottom mounted by means not shown so as to dip into an outer cylindrical vessel 2. The top of the inner vessel 1 is connected via a pipe 3 to a zinc condenser 4 which may be of any suitable form which is in turn connected to a vacuum pump 5.

Cooling means 6 are mounted near the bottom of the outer vessel 2 and feed pipe 7 is connected to enter the vessel 1 tangentially towards the top.

The dotted band 8 represents a layer of molten zinc near the top of the inner vessel 1 of, say, 95% zinc, 5% lead, below which is the zinc-rich molten lead layer 9.

A layer of molten zinc 10 is shown in the condenser.

In the operation of this apparatus, molten lead, which contains dissolved zinc, and usually some cadmium flows into the inner vessel from the sump of a lead pump in a lead-splash condenser 12 circuit, such as disclosed, for example, in U.S. Patent 2,668,047 of February 2, 1954. The zinc-rich lead is produced in primary condenser 12, by condensation on the circulating lead, of zinc vapour containing some lead and usually some cadmium, which has been produced in zinc blast furnace 14 and is conducted from the top of the furnace via conduit 15 to the lead-splash condenser 12. The zinc-rich lead enters via the tangential inlet duct 7, just below the lead/zinc interface and gives up some of its sensible heat to the zinc layer 8, this heat being dissipated as latent heat of evaporation of zinc. At the same time the lead takes up some zinc from the zinc layer. This is a more or less instantaneous heat transfer in the turbulent zone around the interface. The lead then flows downwards through the cylindrical vessel 1 with relatively little heat loss until it reaches a level near the bottom of the vessel 1 where the coolers 6 are situated. The vessel 1 is lined with a suitable refractory brickwork lining 1a and the coolers may be of any known type, e.g. coils or water cooled sections in the walls of the vessel. Zinc separates from the molten lead and the droplets of zinc rise countercurrent to the downward-flowing lead stream so as to form the layer 8 of substantially pure zinc on top of the lead. Thus, on top of the lead, there collects a layer of zinc containing up to about 5% of lead. This layer is being continuously evaporated by application of vacuum at the duct 3 and the zinc vapour passes to the zinc condenser 4 of a known type. Any zinc vapour not condensed at 10 is removed in a cold-trap 10a so as to avoid damage to the vacuum pump 5. The cooled molten lead leaving the inner vessel 1 passes under the bottom rim of the cylinder and into the outer vessel 2. From here it overflows at a constant rate into a conduit 13 and is returned to the lead-splash condenser system 12 to be used for further condensation of zinc vapour condensed molten zinc leaves the secondary condenser 4 through an outlet 17. The lead inlet point, or feed pipe 7, is situated at such a level that the input lead enters the vessel tangentially just below the lead/zinc interface 8a. Thus there is considerable turbulence at the zinc/lead interface and slight turbulence at the top surface of the layer of molten zinc-rich (from which the lead evaporation occurs). The temperature of the input lead will normally be in the range 550°–600° C. and the temperature of the lead leaving the bottom of the vessel 2 will be about 450°–550° C. The temperature of the zinc condenser 4 will be maintained at about 420°–430° C.

Evaporation takes place from a substantially pure zinc layer instead of from a dilute solution of zinc in lead. This leads to the following advantages over previously described applications:

(a) A purer zinc vapour is formed and this means a higher grade of condensed zinc product.

(b) A smaller surface area is required for evaporation, i.e. elaborate spreading means are not required.

(c) A lesser degree of vacuum is necessary to evaporate zinc. This reduces the practical difficulties of providing a very high vacuum in the system.

The vacuum line 3 to the condenser, by any suitable means 16, should be heated to prevent condensation of solid zinc there. The top 18 of the vacuum chamber should be removable to give access, for dross removal from the zinc surface.

The entire vacuum cylinder should be removable from the bath, for ease of cleaning the bath and the cylinder.

Various modifications may be made in accordance with the invention. Thus while a single-stage condenser has been shown for the sake of simplicity, this may, however, consist of a series of stages, the first of which condenses a relatively lead-rich zinc, the second a very pure zinc and the third, a relatively cadmium-rich zinc. It may also be of advantage to allow a small amount of refluxing above the evaporating surface, so that a small amount of zinc containing most of the lead from the vapour condenses and falls back into the bath before entering the vacuum line to the condenser.

I claim:
1. In apparatus for recovering high purity molten zinc from a body of molten lead in a primary zinc condenser employed to condense zinc vapour obtained in a zinc smelting furnace, the molten lead being rich in dissolved zinc, by distilling the lower boiling point zinc from the higher boiling point lead while maintaining the lead in its molten form, and separately condensing the resulting zinc vapour to molten zinc in a secondary zinc condenser, the improvement in combination therewith which comprises:
   (a) an upright lead-zinc separator chamber with an inlet conduit connecting the upper portion of the separator chamber for the entrance therein of a stream of the zinc-rich molten lead from the primary zinc condenser to form a column thereof, a vapour outlet conduit connecting the top part of the separator chamber for the withdrawal of high purity zinc vapour, and an outlet conduit connecting the lower portion of the separator chamber for the withdrawal of molten lead de-nuded of zinc;
   (b) the high purity zinc vapour outlet conduit connects the separator chamber with the secondary zinc condenser;
   (c) the lower portion of the lead-zinc separator chamber is provided with means for cooling the lower portion of its column of molten zinc-rich lead to facilitate throwing dissolved zinc out of solution into droplets of molten zinc;
   (d) another conduit connects the top part of the secondary zinc condenser with a vacuum pump to place the freeboard space of the upper part of the separator chamber, the high purity zinc vapour conduit, and its connecting secondary zinc condenser under vacuum; and
   (e) the secondary zinc condenser is provided with an outlet for the withdrawal of high purity molten zinc from the system.

2. Apparatus according to claim 1, in which the inlet conduit for the stream of molten zinc-rich lead connects the separator chamber with the primary zinc condenser as the source of the molten zinc-rich lead.

3. Apparatus according to claim 1, in which the inlet conduit for the stream of molten zinc-rich lead connects the separator chamber with the primary zinc condenser as the source of the molten zinc-rich lead; and the inlet conduit is provided with a pump to force the stream of molten zinc-rich lead under pressure from the primary zinc condenser into the separator chamber.

4. Apparatus according to claim 1, in which the inlet conduit for the stream of molten zinc-rich lead connects the separator chamber with a primary lead splash condenser as the source of the molten zinc-rich lead.

5. Apparatus according to claim 1, in which the inlet conduit for the stream of molten zinc-rich lead connects the separator chamber with a primary lead splash condenser as the source of the molten zinc-rich lead; and the inlet conduit is provided with a pump to force the stream of molten zinc-rich lead under pressure from the lead splash condenser into the separator chamber.

6. Apparatus according to claim 1, in which the lower portion of the lead-zinc separator chamber is provided with interior cooling coils for cooling the lower portion of its column of zinc-rich molten lead to facilitate throwing dissolved zinc out of solution into droplets of molten zinc.

7. Apparatus according to claim 1, in which the inlet conduit for the stream of molten zinc-rich lead connects the upper portion of the lead-zinc separator chamber tangentially to impart a swirling motion to the incoming stream of molten zinc-rich lead and to confine resulting turbulence to the upper portion of the column while leaving the lower portion of the column substantially quiescent.

8. Apparatus according to claim 1, in which the inlet conduit for the stream of molten zinc-rich lead connects the separator chamber with the primary zinc condenser as the source of the molten zinc-rich lead; the inlet conduit is provided with a pump to force the stream of molten zinc-rich lead under pressure from the primary zinc condenser into the separator chamber; and the lower portion of the separator chamber is provided with means for cooling the lower portion of its column of molten zinc-rich lead to facilitate throwing dissolved zinc out of solution into droplets of molten zinc.

9. Apparatus according to claim 1, in which the inlet conduit for the stream of molten zinc-rich lead connects the separator chamber with a primary lead splash condenser as the source of the molten zinc-rich lead; and the lower portion of the separator chamber is provided with means for cooling the lower portion of its column of molten zinc-rich lead to facilitate throwing dissolved zinc out of solution into droplets of molten zinc.

10. Apparatus according to claim 1, in which the separator chamber is divided into two generally separated telescoping sections; the upper section is substantially smaller in cross-section than the lower section and depends into the inside of, but does not extend, at least wholly, to the bottom of the lower section, the lower section acting as a baffle for the underflowing, and withdrawal, of molten lead de-nuded of zinc in the upper section; and the outlet conduit for the zinc de-nuded molten lead connects directly with the lower section.

11. Apparatus according to claim 1, in which the separator chamber is divided into two generally separated telescoping sections; the upper section is substantially smaller in cross-section than the lower section and depends into the inside of, but does not extend, at least wholly, to the bottom of the lower section, the lower section acting as a baffle for the underflowing, and withdrawal, of molten lead de-nuded of zinc in the upper section; the lower portion of the upper section is provided with means for cooling the lower portion of its column of molten zinc-rich lead to facilitate throwing dissolved zinc out of solution into droplets of molten zinc; and the outlet conduit for the zinc de-nuded molten lead connects directly with the lower section.

12. Apparatus according to claim 1, in which the inlet conduit for the stream of molten zinc-rich lead connects the separator chamber with the primary zinc condenser as the source of the molten zinc-rich lead; and the outlet conduit for the zinc de-nuded lead connects the lower portion of the separator chamber with the interior of the primary zinc condenser for the passage therethrough of molten lead de-nuded of zinc for the cyclic re-use of the molten lead.

13. Apparatus according to claim 1, in which the inlet conduit for the stream of molten zinc-rich lead connects the separator chamber with the primary zinc condenser as the source of the molten zinc-rich lead; the inlet conduit is provided with a pump to force the stream of molten zinc-rich lead under pressure from the primary zinc condenser into the separator chamber; and the outlet conduit for the zinc de-nuded lead connects the lower portion of the separator chamber with the interior of the primary zinc condenser for the passage therethrough of molten lead de-nuded of zinc for the cyclic re-use of the molten lead.

14. Apparatus according to claim 1, in which the conduit for the stream of molten zinc-rich lead connects the separator chamber with a primary lead splash condenser as the source of the molten zinc lead; and the outlet conduit for the zinc de-nuded lead connects the lower portion of the separator chamber with the interior of the primary lead splash condenser for the passage therethrough of molten lead de-nuded of zinc for the cyclic re-use of the molten lead.

15. Apparatus according to claim 1, in which the inlet conduit for the stream of molten zinc-rich lead connects the separator chamber with a primary lead splash condenser for zinc vapour from the zinc smelting furnace as the source of the molten zinc-rich lead; the inlet conduit is provided with a pump to force the stream of molten zinc-rich lead under pressure from the lead splash condenser into the separator chamber; and the outlet for the zinc de-nuded lead connects the lower portion of the separator chamber with the interior of the primary lead splash condenser for the passage therethrough of molten lead de-nuded of zinc for the cyclic re-use of the molten lead.

16. Apparatus according to claim 1, in which a cold trap is provided in the vapour conduit connecting the secondary zinc condenser with the vacuum pump to condense vapour not condensed in the secondary zinc condenser and hence prevent it from entering and damaging the vacuum pump.

17. Apparatus according to claim 1, in which the freeboard surface area of the top of the separator chamber and the surface area of the exit portion of the vapour conduit to the secondary zinc condenser are sufficient to function as a reflux condenser for lead vapour that may accompany the vacuum distilled zinc vapour.

References Cited

UNITED STATES PATENTS

| | | | |
|---|---|---|---|
| 2,462,783 | 2/1949 | Shropshire | 266—37 |
| 2,463,468 | 3/1949 | Poland | 75—88 X |

J. SPENCER OVERHOLSER, *Primary Examiner.*

E. MAR, *Assistant Examiner.*